(12) United States Patent
Karkkainen et al.

(10) Patent No.: US 12,177,942 B2
(45) Date of Patent: *Dec. 24, 2024

(54) DYNAMIC USE OF REMOTE UNITS IN A WIRELESS COMMUNICATIONS SYSTEM (WCS)

(71) Applicant: CORNING RESEARCH & DEVELOPMENT CORPORATION, Corning, NY (US)

(72) Inventors: Risto Karkkainen, Pleasanton, CA (US); Shlomi Kulik, Elkana (IL); Shirish Nagaraj, Pleasanton, CA (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,319

(22) Filed: Nov. 9, 2023

(65) Prior Publication Data

US 2024/0073999 A1    Feb. 29, 2024

Related U.S. Application Data

(63) Continuation of application No. 17/360,469, filed on Jun. 28, 2021, now Pat. No. 11,832,353.

(51) Int. Cl.
| | |
|---|---|
| *H04W 88/08* | (2009.01) |
| *H04L 5/00* | (2006.01) |
| *H04L 25/02* | (2006.01) |
| *H04W 74/08* | (2024.01) |
| *H04W 74/0833* | (2024.01) |

(52) U.S. Cl.
CPC ......... *H04W 88/085* (2013.01); *H04L 5/0051* (2013.01); *H04L 25/0226* (2013.01); *H04W 74/0833* (2013.01)

(58) Field of Classification Search
CPC ............ H04W 88/085; H04W 74/0833; H04L 5/0051; H04L 25/0226
See application file for complete search history.

(56) References Cited

U.S. PATENT DOCUMENTS

| | | | |
|---|---|---|---|
| 10,014,944 B2 | 7/2018 | Berlin et al. | |
| 11,832,353 B2* | 11/2023 | Karkkainen | ........ H04L 25/0226 |
| 2017/0373890 A1* | 12/2017 | Fertonani | .................. H04L 9/40 |
| 2020/0374981 A1* | 11/2020 | Hoffmann | ............. H04W 24/02 |

* cited by examiner

*Primary Examiner* — Derrick V Rose
(74) *Attorney, Agent, or Firm* — William D. Doyle

(57) ABSTRACT

Systems and methods for dynamic use of remote units in a wireless communications system (WCS) include a digital routing unit (DRU) that sums incoming (uplink) signals from the remote units that have active user equipment, while suppressing signals from the remote units that do not have active user equipment. Similarly, the DRU only sends outgoing (downlink) signals to the remote units that have active user equipment. The selective summing of uplink signals improves the gain at the DRU, which allows optimization of the dynamic range of the DRU. Likewise, by selectively sending streams to the remote units, power consumption at the remote units may be reduced, which may allow for smaller, less expensive remote units to be deployed.

10 Claims, 12 Drawing Sheets

DYNAMIC USE OF REMOTE UNITS IN A WIRELESS COMMUNICATIONS SYSTEM (WCS)

CROSS-REFERENCE TO RELATED APPLICATIONS

This application is a continuation application of U.S. patent application Ser. No. 17/360,469 filed Jun. 28, 2021, the content of which is relied upon and incorporated herein by reference in its entirety.

BACKGROUND

The disclosure relates generally to controlling how remote units manage uplink and downlink communication streams between remote units and digital routing units (DRUs) in a wireless communications system, such as a distributed antenna system (DAS) within a long term evolution (LTE) fourth generation (4G), fifth generation (5G), or a 5G-new radio (5G-NR) system and/or other distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Various communications systems have been provided to transmit and/or distribute communications signals to wireless devices called "clients," "client devices," "user equipment," or "wireless client devices," which must reside within the wireless range or "cell coverage area" to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a DAS involves the use of radio nodes/base stations that transmit communications signals distributed over physical communications media to remote units forming distributed radio frequency (RF) antenna coverage areas, also referred to as "antenna coverage areas."

Within a DAS, a single DRU may control multiple remote units, sending signals to and receiving signals from the multiple remote units. For both 4G and 5G type DAS, commercial pressures promote improved power management and reception quality.

No admission is made that any reference cited herein constitutes prior art. Applicant expressly reserves the right to challenge the accuracy and pertinency of any cited documents.

SUMMARY

Aspects disclosed herein include systems and methods for dynamic use of remote units in a wireless communications system (WCS). In an exemplary aspect, a digital routing unit (DRU) sums incoming (uplink) signals from the remote units that have active user equipment, while suppressing signals from the remote units that do not have active user equipment. Similarly, the DRU only sends outgoing (downlink) signals to the remote units that have active user equipment. The selective summing of uplink signals improves the gain at the DRU, which allows optimization of the dynamic range of the DRU. Likewise, by selectively sending streams to the remote units, power consumption at the remote units may be reduced, which may allow for smaller, less expensive remote units to be deployed.

One exemplary embodiment of the disclosure relates to a DRU. The DRU comprises a summation circuit. The summation circuit is configured to be coupled to a plurality of remote units (RUs). The summation circuit is also configured to receive a selection signal indicating which of the plurality of RUs are actively serving user equipment. The summation circuit is also configured to generate a summed data signal for transmission based on the selection signal.

Another exemplary embodiment of the disclosure relates to an RU. The RU comprises an antenna configured to send to and receive signals from user equipment. The RU also comprises a first extractor circuit configured to detect information within the received signals, wherein the information indicates an active user equipment.

Another exemplary embodiment of the disclosure relates to a WCS. The WCS comprises a plurality of RUs. Each RU comprises a respective antenna configured to serve user equipment. The WCS also comprises a DRU coupled to the plurality of RUs via one or more optical communication media. The DRU comprises a summation circuit. The summation circuit is configured to be coupled to the plurality of RUs. The summation circuit is also configured to receive a selection signal indicating which of the plurality of RUs are actively serving user equipment. The summation circuit is also configured to generate a summed data signal for transmission based on the selection signal.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Aspects disclosed herein include systems and methods for dynamic use of remote units in a wireless communications system (WCS). In an exemplary aspect, a digital routing unit (DRU) sums incoming (uplink) signals from the remote units that have active user equipment, while suppressing signals from the remote units that do not have active user equipment. Similarly, the DRU only sends outgoing (downlink) signals to the remote units that have active user equipment. The selective summing of uplink signals improves the gain at the DRU, which allows optimization of the dynamic range of the DRU. Likewise, by selectively sending streams to the remote units, power consumption at the remote units may be reduced, which may allow for smaller, less expensive remote units to be deployed.

Figure 1:
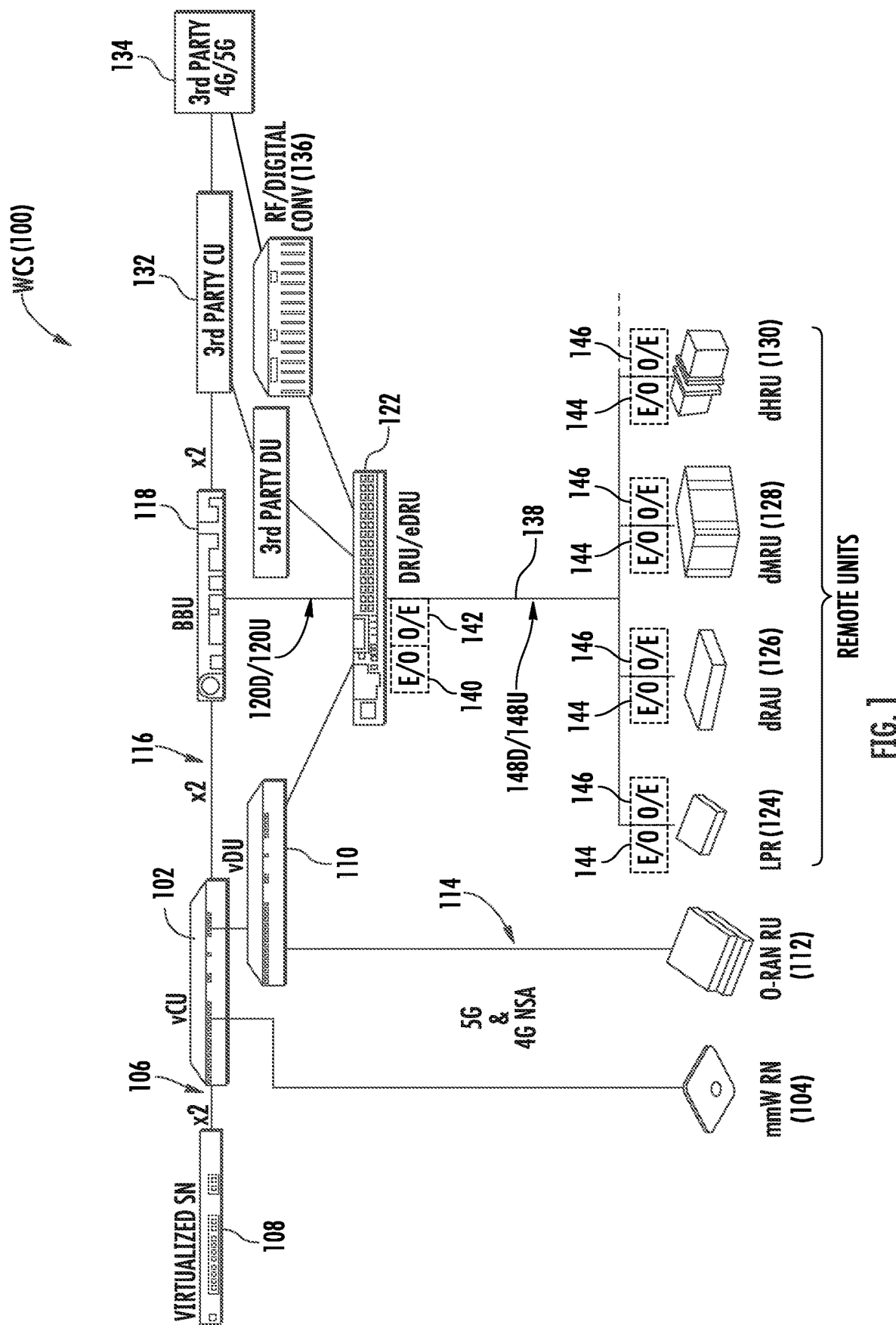
FIG. 1 is a schematic diagram of an exemplary WCS configured according to any of the embodiments disclosed herein that allow dynamic use of remote units by the digital routing unit.

An overview of a WCS that may include a distributed antenna system (DAS) is provided with reference to FIG. 1 to give context for the remote units and DRUs that dynamically use the remote units. A more detailed discussion of a DRU serving multiple remote units and a summation circuit used therein begins below with reference to FIG. 2 with discussions of how uplink signals may be selectively summed to reduce gain and downlink signals may be selectively provided to reduce power consumption begins below with reference to FIG. 3.

In this regard, FIG. 1 is a schematic diagram of an exemplary WCS 100 configured according to any of the aspects disclosed herein to support dynamic use of remote units. The WCS 100 supports both legacy 4G long term evolution (LTE), 4G/5G non-standalone (NSA), and 5G standalone communications systems. As shown in FIG. 1, a centralized services node 102 is provided that is configured to interface with a core network to exchange communications data and distribute the communications data as radio signals to remote units. In this example, the centralized services node 102 (also referred to as vCU in FIG. 1) is configured to support distributed communications services to an mmWave radio node (mmW RN) 104. Despite that only one mmWave radio node 104 is shown in FIG. 1, it should be appreciated that the WCS 100 can be configured to include additional numbers of the mmWave radio node 104, as needed. The functions of the centralized services node 102 can be virtualized through an x2 interface 106 to another services node 108. The centralized services node 102 can also include one or more internal radio nodes that are configured to be interfaced with a distribution unit (DU) or distribution node 110 to distribute communications signals for the radio nodes to an open radio access network (RAN) (O-RAN) remote unit 112 that is configured to be communicatively coupled through an O-RAN interface 114.

The centralized services node 102 can also be interfaced through an x2 interface 116 to a digital baseband unit (BBU) 118 that can provide a digital signal source to the centralized services node 102. The digital BBU 118 is configured to provide a signal source to the centralized services node 102 to provide downlink communications signals 120D to the O-RAN remote unit 112 as well as to a DRU 122 as part of a digital DAS. The DRU 122 is configured to split and distribute the downlink communications signals 120D to different types of remote units, including a low-power remote unit (LPR) 124, a radio antenna unit (dRAU) 126, a mid-power remote unit (dMRU) 128, and a high-power remote unit (dHRU) 130. The DRU 122 is also configured to combine uplink communications signals 120U received from the LPR 124, the dRAU 126, the dMRU 128, and the dHRU 110 and provide the combined uplink communications signals to the digital BBU 118. The digital BBU 118 is also configured to interface with a third-party central unit 132 and/or an analog source 134 through a radio frequency (RF)/digital converter 136.

The DRU 122 may be coupled to the LPR 124, the dRAU 126, the dMRU 128, and the dHRU 130 via an optical fiber-based communications medium 138. In this regard, the DRU 122 can include a respective electrical-to-optical (E/O) converter 140 and a respective optical-to-electrical (O/E) converter 142. Likewise, each of the LPR 124, the dRAU 126, the dMRU 128, and the dHRU 130 can include a respective E/O converter 144 and a respective O/E converter 146.

The E/O converter 140 at the DRU 122 is configured to convert the downlink communications signals 120D into downlink optical communications signals 148D for distribution to the LPR 124, the dRAU 126, the dMRU 128, and the dHRU 130 via the optical fiber-based communications medium 138. The O/E converter 146 at each of the LPR 124, the dRAU 126, the dMRU 128, and the dHRU 130 is configured to convert the downlink optical communications signals 148D back to the downlink communications signals 120D. The E/O converter 144 at each of the LPR 124, the dRAU 126, the dMRU 128, and the dHRU 130 is configured to convert the uplink communications signals 120U into uplink optical communications signals 148U. The O/E converter 142 at the DRU 122 is configured to convert the uplink optical communications signals 148U back to the uplink communications signals 120U.

It should be appreciated that the downlink optical communications signals 148D and the uplink optical communication signals 148U may use a transport standard known as common public radio interface (CPRI). CPRI defines a protocol for providing connectivity, synchronization and control communications between baseband units and remote radio units.

Figure 2:
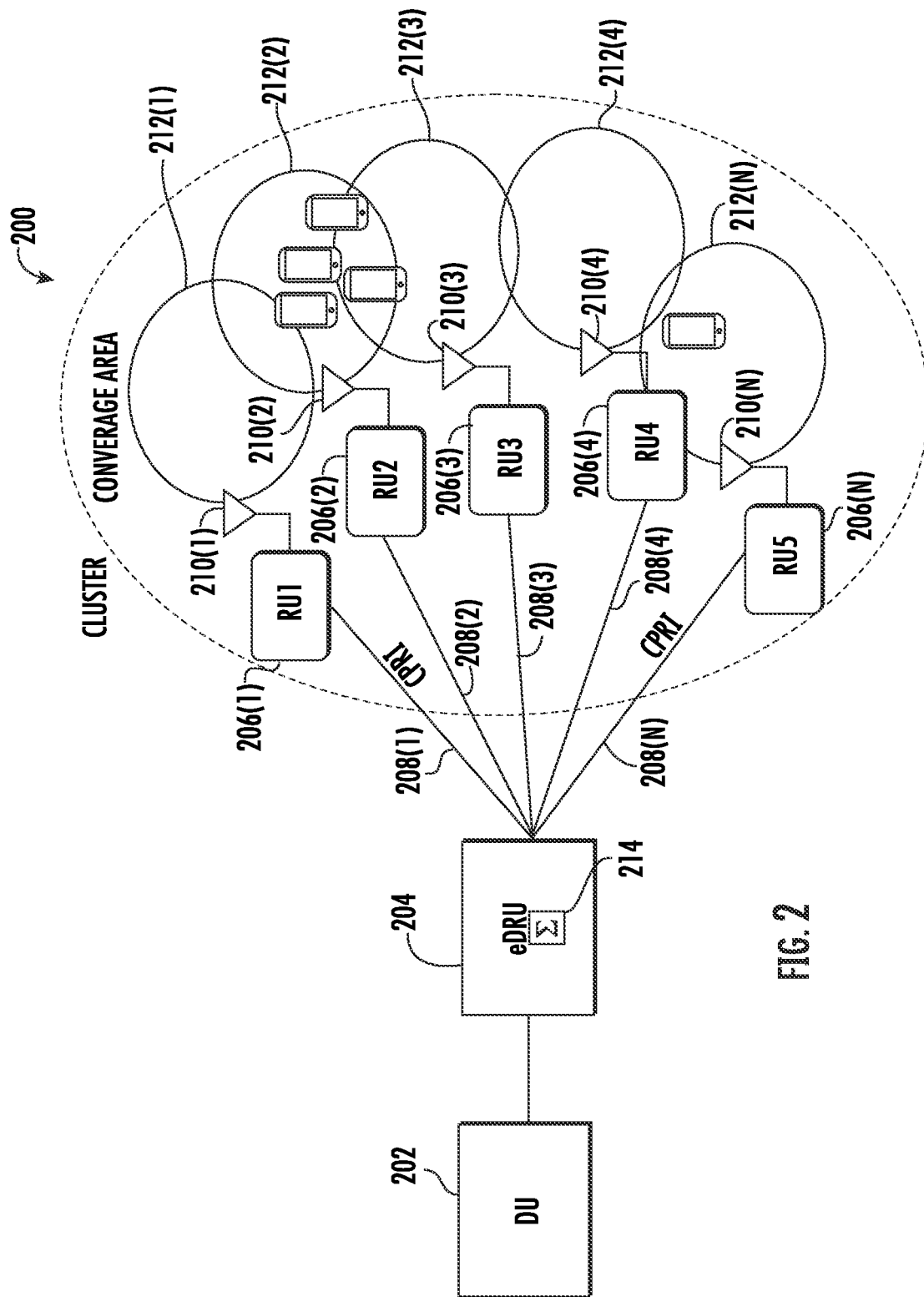
FIG. 2 is a block diagram of an exemplary digital routing unit (DRU) coupled to multiple remote units in a configuration that may benefit from the dynamic use of the remote units.

FIG. 2 provides a block diagram of portions of the WCS 100 of interest. Specifically, a DAS 200 is illustrated where a DU 202, analogous to the DU 110 is connected to a DRU 204. The DRU 204 is coupled to multiple remote units (RUs) 206(1)-206(N), (sometimes referred to as a cluster), where, as illustrated, N is five (5), although it should be appreciated that N may be some other value. The cluster serves the same cell with multiple RUs (i.e., the RUs 206(1)-206(N)), with the understanding that the size of the cluster and the number of RUs within the cluster (i.e., N) can change depending on the deployment. The DRU 204 and the RUs 206(1)-206(N) may be coupled through communication media 208(1)-208(N), which carry CPRI compliant signals thereon. The signals may include in-phase (I) and quadrature phase (Q), collectively IQ data. Each RU 206(1)-206(N) may include one or more respective antennas 210(1)-210(N), which in turn create coverage areas 212(1)-212(N). The DRU 204 may include a summation circuit 214, which is explained in greater detail below with reference to FIG. 3.

Figure 3:
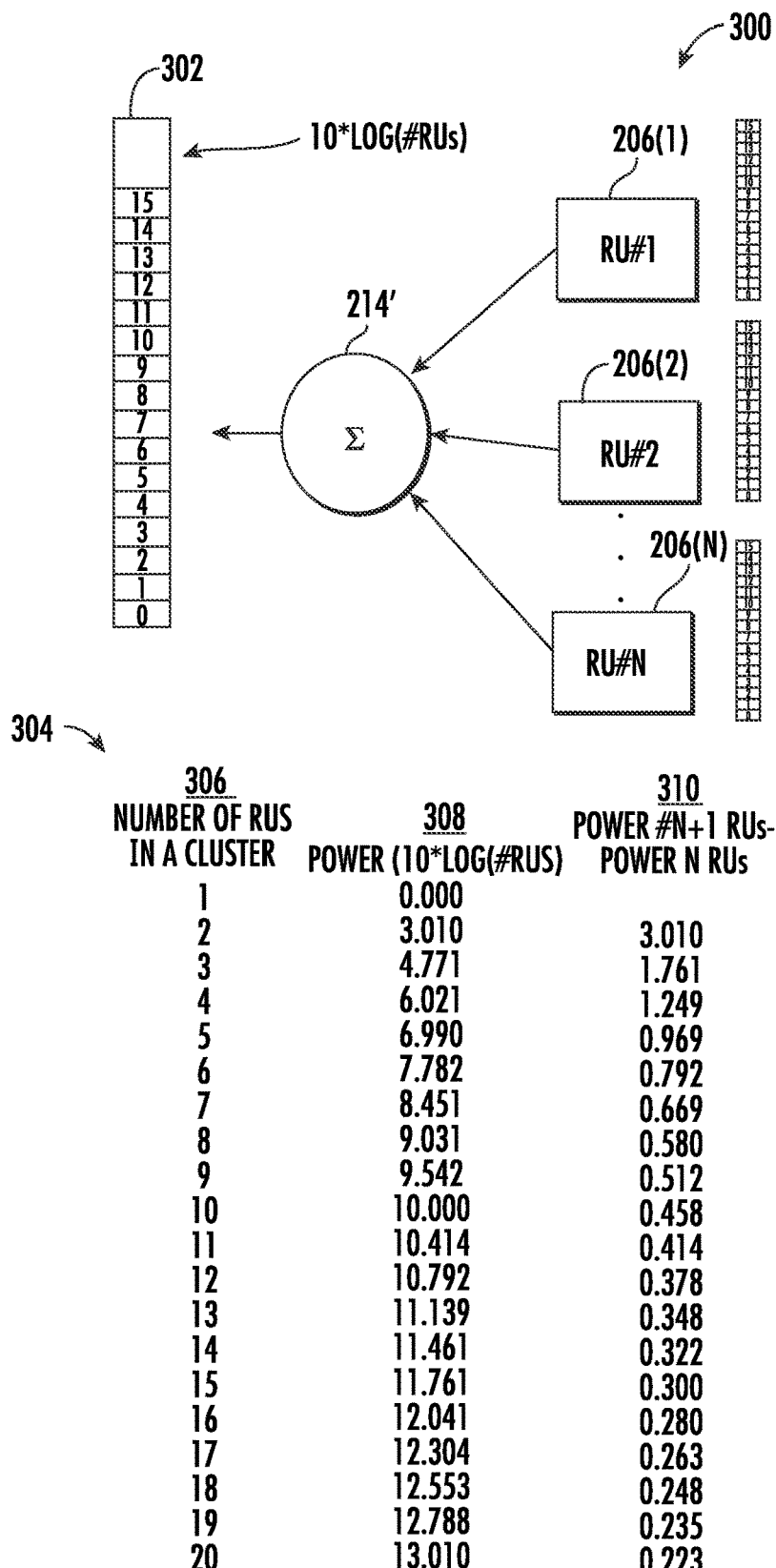
FIG. 3 is a table showing the cumulative gain at the DRU from multiple remote units along with the incremental gain caused by each additional remote unit.

In this regard, FIG. 3 stylistically represents what the summation circuit 214 does in conventional systems without the benefit of the dynamic use of the RUs 206(1)-206(N). Specifically, in a traditional system 300, the summation circuit 214' may sum signals from each of the RUs 206(1)-206(N). This summation results in up to 10*log(N) decibels to the cluster power 302. When a given RU 206 is not delivering any user equipment (UE) data to the summation circuit 214', the system 300 will still consider the all the RUs 206(1)-206(N), even though it will not add any gain to the system 300. The end result of summing these "inactive" RUs is that there is a non-optimal dynamic range, which, in turn, can lead to poor reception. The differences in power levels experienced are better shown in the table 304 in FIG. 3, where column 306 is the number of RUs present in a given cluster served by a summation circuit 214'. Column 308 provides the summed power for given number of RUs (e.g., analogous to the output power 302). Column 310 provides the difference adding an additional RU to the summed power makes. Thus, if two RUs are summed, the difference in power is 3.010 dB. If three RUs are summed, the additional power consumed by the third, relative to the sum of just two is 1.761 dB. The difference from one to three RUs is 4.771 and so on. In an extreme example, if only one RU is "summed" instead of the normal twenty, a 13 dB savings may be achieved. The ramifications of table 304 is that there is an incremental power and gain penalty for each RU added to the summation process. If the added RU, in fact, has no UE data, then the penalty is incurred without net benefit and specific negative impact.

While the impact of summing RUs that are not serving UE is discussed above, there is a power penalty for downlink signals as well. The DRU will send data to all the RUs in the cluster, even if the RUs are not active. Likewise, even if an RU is not serving any active UE in a certain frame (or at all), that RU still is required to send data. Sending these signals consumes power and generates heat at the RU.

Exemplary aspects of the present disclosure provide a solution to reduce power consumption and improve reception by selective summation of the signals from the RUs and selective transmission of signals from the DRU to the RUs based on whether the RU has any active UE in the coverage area. To do this, the DRU, or a smart RU, in cooperation with the DU or BBU learns which RUs are actively serving UE. This information is then used to control which signal streams are summed and to which RUs signal streams are sent. If, and when, a new UE appears in the coverage area served by an RU which had been excluded from summation, the signaling which connects the UE to the BBU also causes the DRU to include that RU in the summation.

Figure 4:
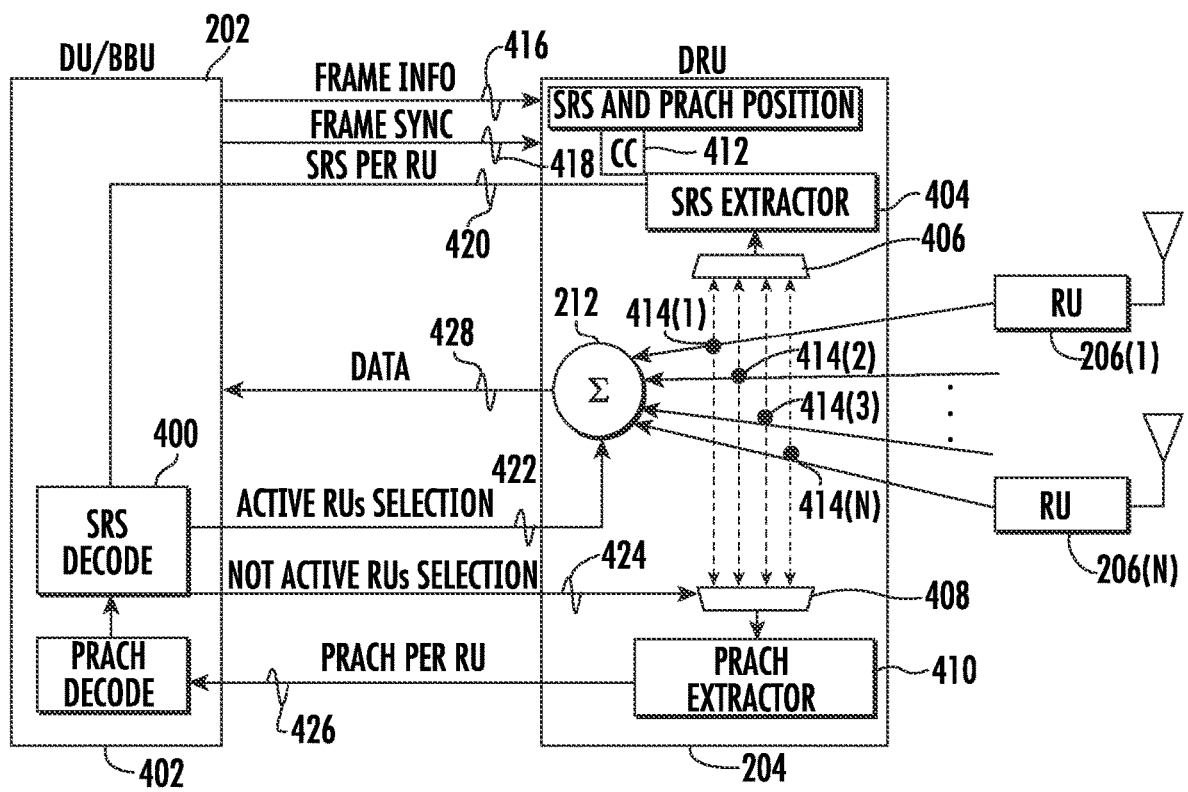
FIG. 4 is a block diagram of a DRU with a summation circuit that receives uplink signals from a plurality of remote units, but only sums signals from remote units that are serving user equipment.

In this regard, FIG. 4 illustrates aa more detailed view of the DU 202 (which can also be a BBU), the DRU 204 and the plurality of RUs 206(1)-206(N) in a DAS 200. Specifically, the DU 202 includes a Sounding Reference Signal (SRS) decode circuit 400 and a Preamble Channel (PRACH) decode circuit 402. The DRU 204 includes an SRS extractor circuit 404, an SRS multiplexer 406, a PRACH multiplexer 408, a PRACH extractor circuit 410, summation circuit 214, and a control circuit 412. Detector circuits 414(1)-414(N) couple the signals from the RUs 206(1)-206(N) to the multiplexers 406, 408.

SRS is standard part of both the 4G-LTE and 5G-NR protocols. SRS provides information over a full bandwidth and is used by the DU or BBU 202 to make resource allocation decisions. The SRS also gives information about the combined effect of multipath fading, scattering, Doppler, and power loss for transmitted signals. The SRS is an uplink only signal and is configured specific to the UE. The SRS can be transmitted as often as every second subframe (i.e., two milliseconds (2 ms) or as infrequently as every sixteenth frame (i.e., 160 ms). The SRS can be sent in wideband mode or in frequency-hopping mode, but what is most relevant is that the DU 202 knows where within the frame(s) the SRS is located for any given UE that is being served by the DU 202. Thus, the DU 202 can inform the control circuit 412 of the SRS position through frame information signal 416 and frame synchronization signal 418. The SRS position may be defined in terms of time and/or frequency.

PRACH is likewise a standard part of both the 4G-LTE and 5G-NR protocols. PRACH is used to carry a random access preamble from the UE towards the BBU 202 and helps the base station adjust uplink timings of the UE. PRACH is used by the UE when the UE wakes up from a sleep mode, when the UE performs a handoff, and when the UE loses uplink timing synchronization. Again, there are a variety of formats that can be used by the PRACH, but, by design, the presence of a PRACH signal from an RU 206(1)-206(N) is detectable by the DRU 204 and passed to the DU 202 as better explained below.

The SRS multiplexer 406 supplies each signal in turn to the SRS extractor 404 which determines if there is SRS information in the signal and identifies which RU has provided the SRS information. The SRS per RU information is sent via a signal 420 to the SRS decode circuit 400, which in turn uses this information to assist in determining an active RU selection signal 422. The active RU selection signal 422 is used by the control circuit 412 to control the summation circuit 214. Additionally, the SRS decode circuit 400 supplies a Not Active RUs selection signal 424 to the PRACH multiplexer 408. Thus, the PRACH multiplexer 408 only passes signals from the not active RUs 206(1)-206(N) to the PRACH extractor 410. The PRACH extractor 410 monitors the signals from the PRACH multiplexer 408 for the presence of PRACH signals and sends detected PRACH signals to the DU 202 through a PRACH per RU signal 426. Detected PRACH signals cause the DU 202 to add those RUs to the active RUs selection signal 422 as well as provide an indication about where to detect SRS signals via signals 416, 418.

Based on the signal 422, the summation circuit 214 sums only the RUs 206(1)-206(N) that are actively serving UE. This eliminates any signals from inactive RUs and reduces the number of RUs that contribute to the gain set forth in the table 304. The summation circuit 214 provides the summed data 428 to the DU 202.

Figure 5:
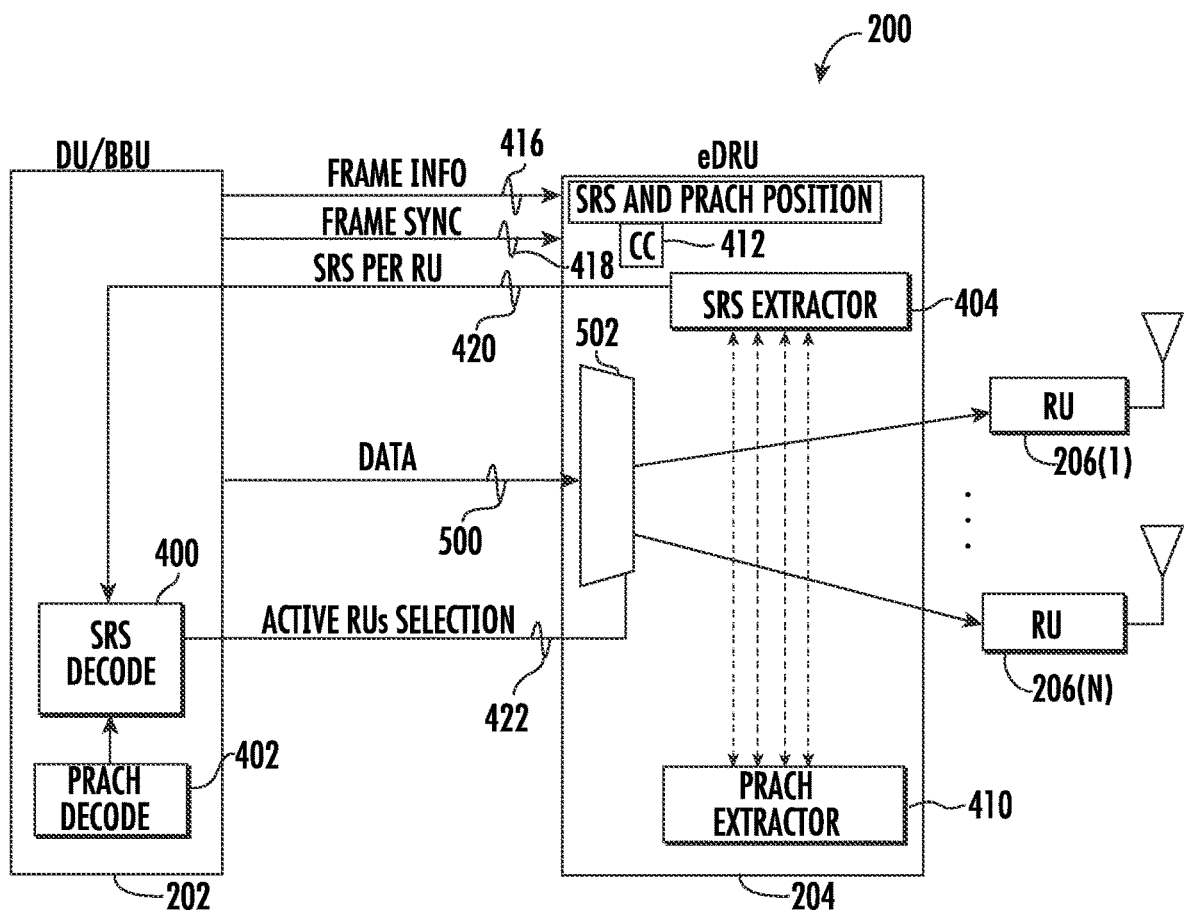
FIG. 5 is a block diagram of the DRU of FIG. 4 sending downlink signals only to remote units that are serving user equipment.

FIG. 5 illustrates the same system 200 but highlights the downlink functionality of the present disclosure. As noted above in the discussion of FIG. 4, the DU 202 informs the DRU 204 about which RUs 206(1)-206(N) are actively serving UE such as through the SRS per RU information sent in signal 420. The DRU 204 receives data signal 500 from the DU 202. The data signal 500 is sent to a splitter 502 which selectively sends signals only to those RUs 206(1)-206(N) that are actively serving UE as indicated by the information in the signal 420. This selective sending to the active RUs 206(1)-206(N) helps reduce power consumption both at the DRU 204 and at the inactive RUs 206(1)-206(N) because the logic elements in either component are only activated as needed. In an exemplary aspect, when the uplink SRS extractor circuit 404 identifies RUs that serve an active UE, the DU 202 will send the downlink data only to those RUs. This selection may be done by using a selection word that defines how the DRU 204 forks data to the RUs. Similarly, a control word may be sent by the DRU 204 to the RUs 206(1)-206(N) indicating if data is valid or not.

Figure 6:
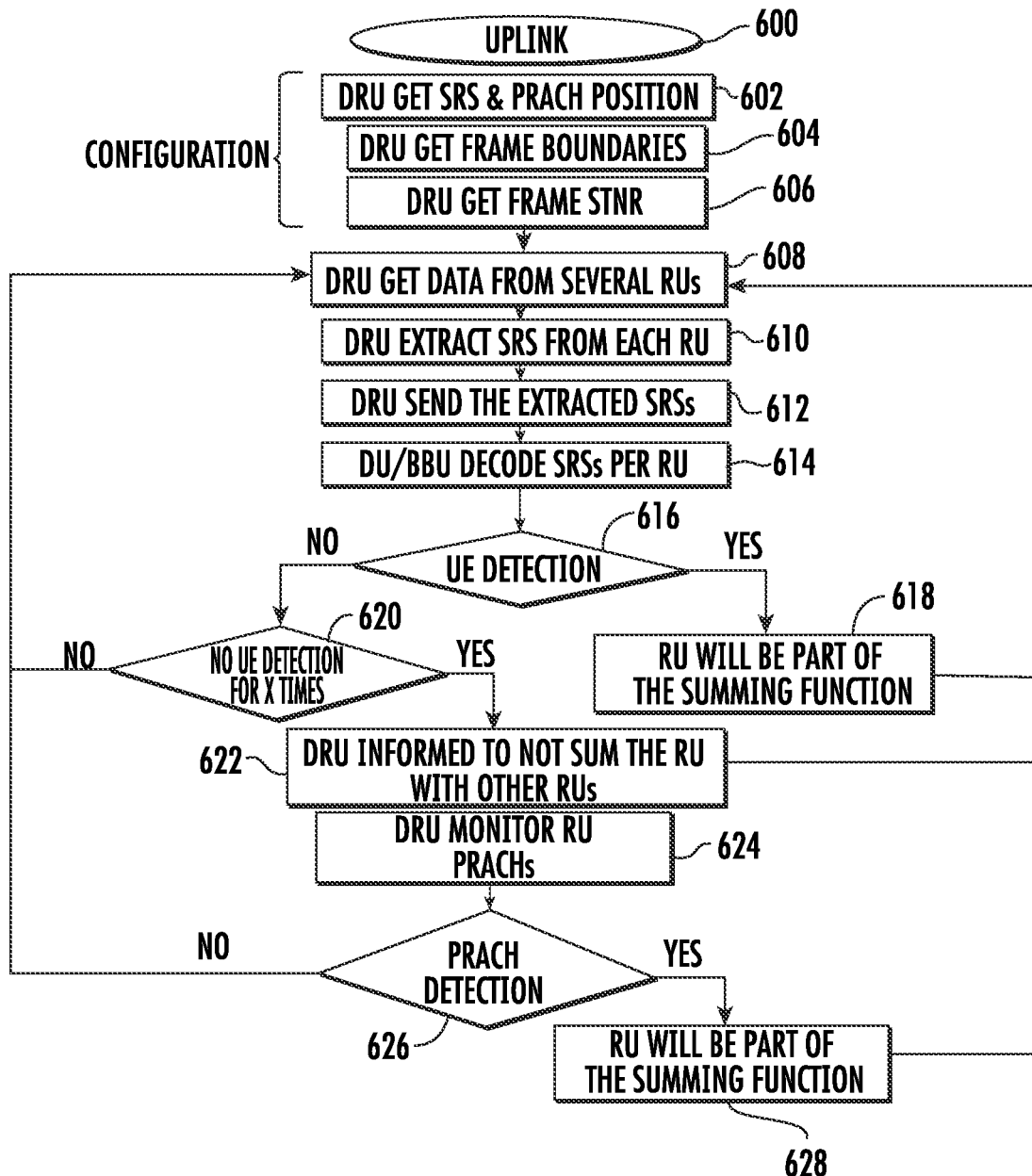
FIG. 6 is a flowchart showing a first process for reducing uplink gain by selectively only summing signals from remote units that are serving user equipment.

FIG. 6 provides a flowchart of a process 600 associated with the uplink portion of the present disclosure. In this regard, the process 600 begins with the DRU 204 getting the SRS and PRACH position information (block 602) such as through the signal 420 as well as getting the frame boundaries (block 604) and the frame sync (block 606) such as through signals 416 and 418, respectively. The DRU 204 also gets data from several RUs 206(1)-206(N) (block 608). The DRU extracts the SRS information from each RU 206(1)-206(N) (block 610) and sends the extracted SRS information to the DU 202 (block 612), such as part of signal 420. The DU 202 decodes the SRS for each RU 206(1)-206(N) (block 614) and performs UE detection (block 616).

With continued reference to FIG. 6, if there are UE detected in the SRS information, then the originating RU 206 will be part of the summing function (block 618) and the process 600 returns to block 608. If, however, no UE was detected, a control circuit at the DU 202 determines if no UE was detected more than a threshold ("X") times (block 620). If the threshold has not been reached, then the process 600 returns to block 608. If, however, the answer to block 620 is yes, the threshold X has been exceeded, then the DU 202 informs the DRU 204 to not sum that RU with other RUs (block 622), such as through the signal 422.

Concurrently, the DRU 204 also monitors the RU PRACH channel (block 624) and checks to see if a PRACH is detected (block 626). If the answer is no, the process 600 returns to block 608. If, the answer is yes, then the RU is added to the summing function (block 628) and the process returns to block 608.

Figure 7:
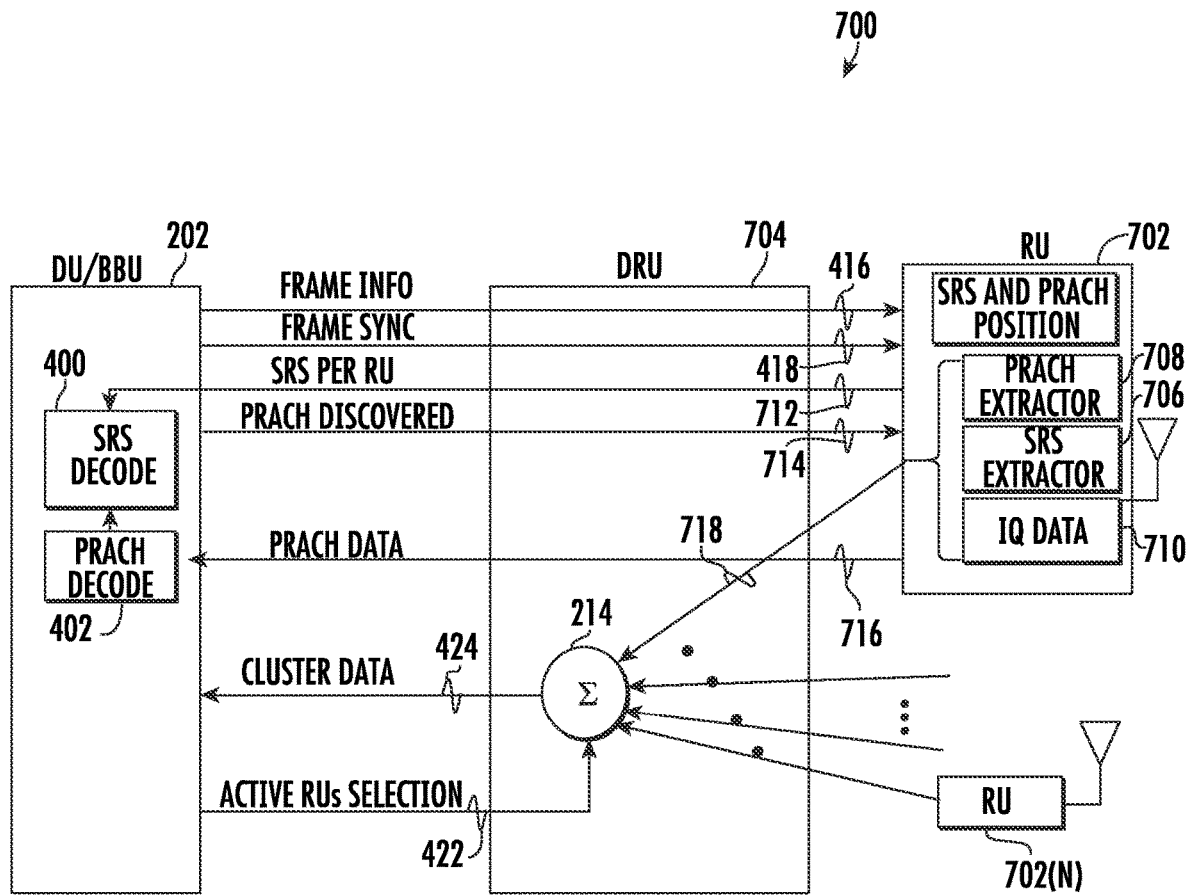
FIG. 7 is a block diagram of a DRU with a summation circuit and a remote unit that selectively sends uplink signals to the DRU for summation based on whether the remote unit is serving user equipment.

The system 200 places most of the processing burden on the DRU 204, which is well suited for this task, but the present disclosure is not so limited. As illustrated in FIG. 7, some of the processing for a DAS 700 may be done in an RU 702. The RU 702 may be an O-RAN remote and may work in the frequency domain. The system 700 includes a DU 202, unchanged from the system 200. Likewise, the system 700 includes a DRU 704, which is similar to the DRU 204, but with less functionality. Alternatively, the circuitry for such functionality may be present but disabled or otherwise unused. The RU 702 includes an SRS extractor circuit 706, a PRACH extractor circuit 708, and an IQ data circuit 710. The RU 702 extracts SRS data and/or PRACH data as such data is received from UE and sends an SRS per RU signal 712 to the DU 202. Likewise, the RU 702 receives signals 416, 418 from the DU 202. The RU 702 also receives a PRACH discovered signal 714 from the DU 202. The RU 702 is also configured to send PRACH data 716 to the DU 202. The signals 416, 418, 712, 714, and 716 may be routed through the DRU 704. The RU 702 also sends signal 718 to the DRU 704, where it is summed with signals from other RUs 702(2)-702(N) by the summation circuit 214 based on the selection signal 422.

Figure 8:
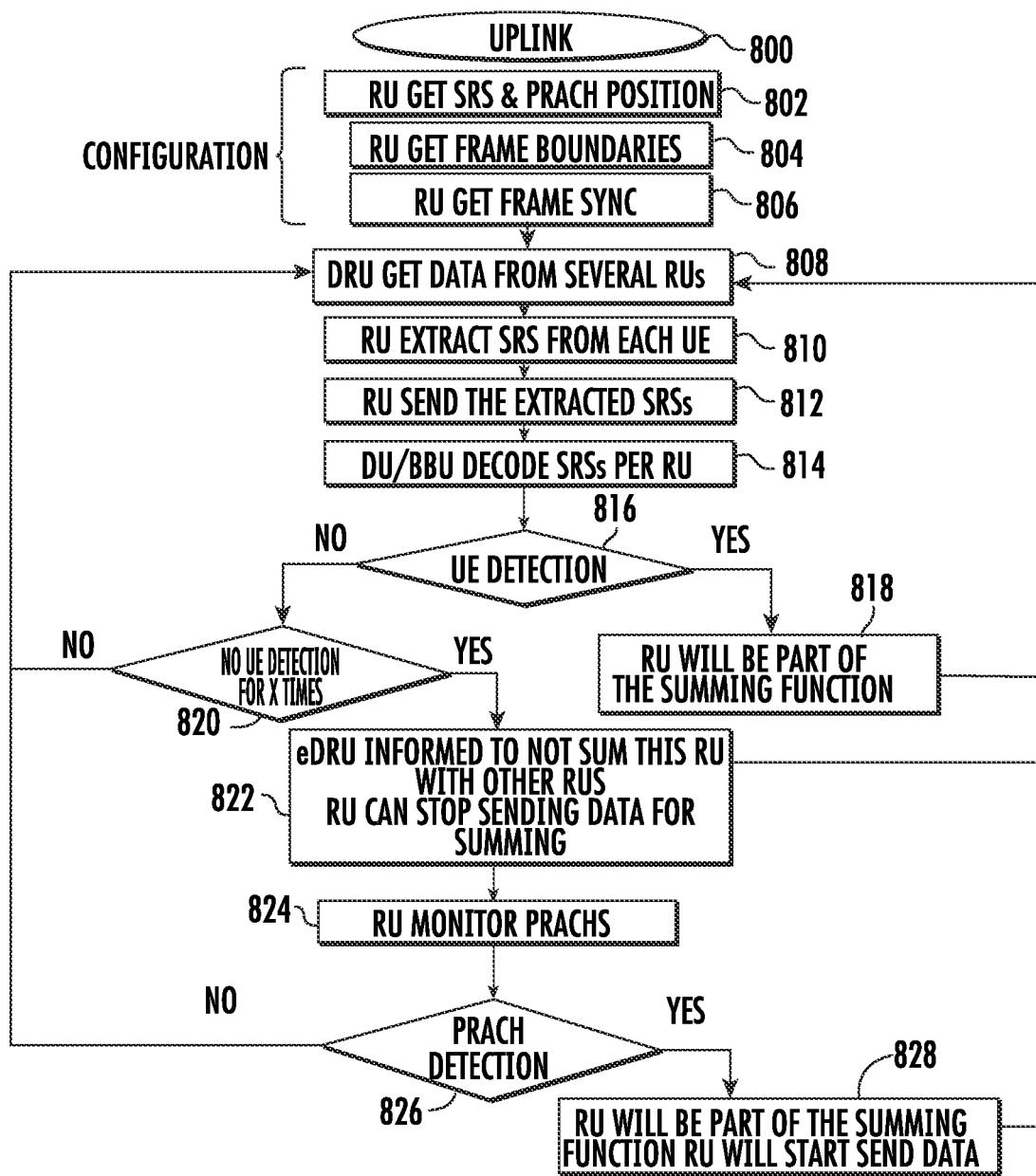
FIG. 8 is a flowchart showing a process for reducing uplink gain using the remote unit of FIG. 7.

A process 800 corresponding to handling of uplink data in the system 700 is illustrated in FIG. 8. In this regard, the process 800 begins with the RU 702 getting the SRS and PRACH position information (block 802) such by examination of traffic with the UE or by a signal (not illustrated from the DRU 202). Further, the RU 702 receives the frame boundaries (block 804) and the frame sync (block 806) such as through signals 416 and 418, respectively. The DRU 704 gets data from several RUs 702-702(N) (block 808). The RU 702 extracts the SRS information from each UE (block 810) and sends the extracted SRS information to the DU 202 (block 812), such as part of signal 712. The DU 202 decodes the SRS for each RU 702-702(N) (block 814) and performs UE detection (block 816).

With continued reference to FIG. 8, if there are UE detected in the SRS information, then the originating RU 702 will be part of the summing function (block 818) and the process 800 returns to block 808. If, however, no UE was detected, the RU 702 determines if no UE was detected more than a threshold ("X") times (block 820). If the threshold has not been reached, then the process 800 returns to block 808. If, however, the answer to block 820 is yes, the threshold X has been exceeded, then the RU 702 informs the DRU 704 to not sum that RU with other RUs (block 822).

Concurrently, the RU 702 also monitors the RU PRACH channel (block 824) and checks to see if a PRACH is detected (block 826). If the answer is no, the process 800 continues. If, the answer is yes, then the RU is added to the summing function (block 828).

Figure 9:
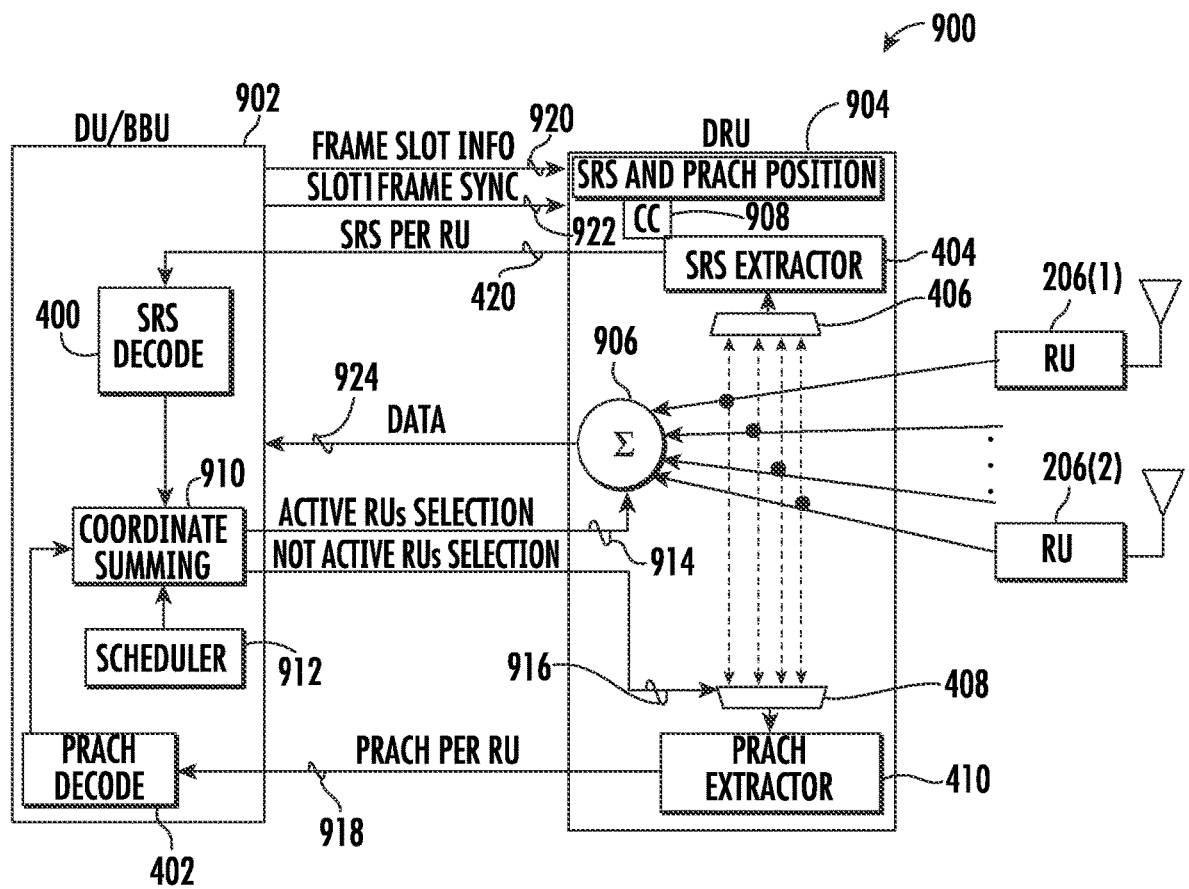
FIG. 9 is a block diagram of a DRU with a summation circuit that sums signals from remote units serving user equipment only during the slots in which the remote units are serving the remote units.

In both examples provided above, it is generally assumed that the entirety of each frame from the DRU to the RU and from the RU to the DRU is processed. However, the present disclosure is not so limited. In a further exemplary aspect, the summation may take place on a slot by slot basis based on which UE are active for which RU in given slots within the frame. Likewise, transmissions to the RU are made selectively on a slot by slot basis instead of sending the entire frame. A system 900 capable of such granular selection is illustrated in FIG. 9. The system 900 includes a DU 902, which has more functionality than the DU 202 as better explained below. While the system 900 could provide the SRS detection and PRACH detection in the RU as is done in the system 700, as illustrated, the system 900 provides the SRS extraction and PRACH extraction in a DRU 904, similar to the DRU 204 and these circuits are labeled identically. However, the DRU 904 has a modified summation circuit 906 that allows for slot by slot summation rather than frame by frame. Likewise, a control circuit 908 has been modified to enable this functionality as needed. As with the DRU 204, the DRU 904 causes the SRS extractor circuit 404 to send information to the DU 902 through signal 420. The DU 902 includes an SRS decode circuit 400 that receives the signal 420 and provides information to a coordinate summing circuit 910 that works with a scheduler circuit 912 to generate the active RU selection signal 914 and the not active RU selection signal 916. The PRACH extractor circuit 410 sends a PRACH per RU signal 918 to the PRACH decode circuit 402, which also works with the coordinate summing circuit 910. The DU 902 also sends a frame/slot info signal 920 and a frame/slot sync signal 922 to the DRU 904 to assist the DRU 904 in finding the correct slots within the correct frames. Finally, the summation circuit 906 sends a data signal 924 to the DU 902 that has slot by slot summation within frames to further reduce unnecessary gain.

Figure 10:
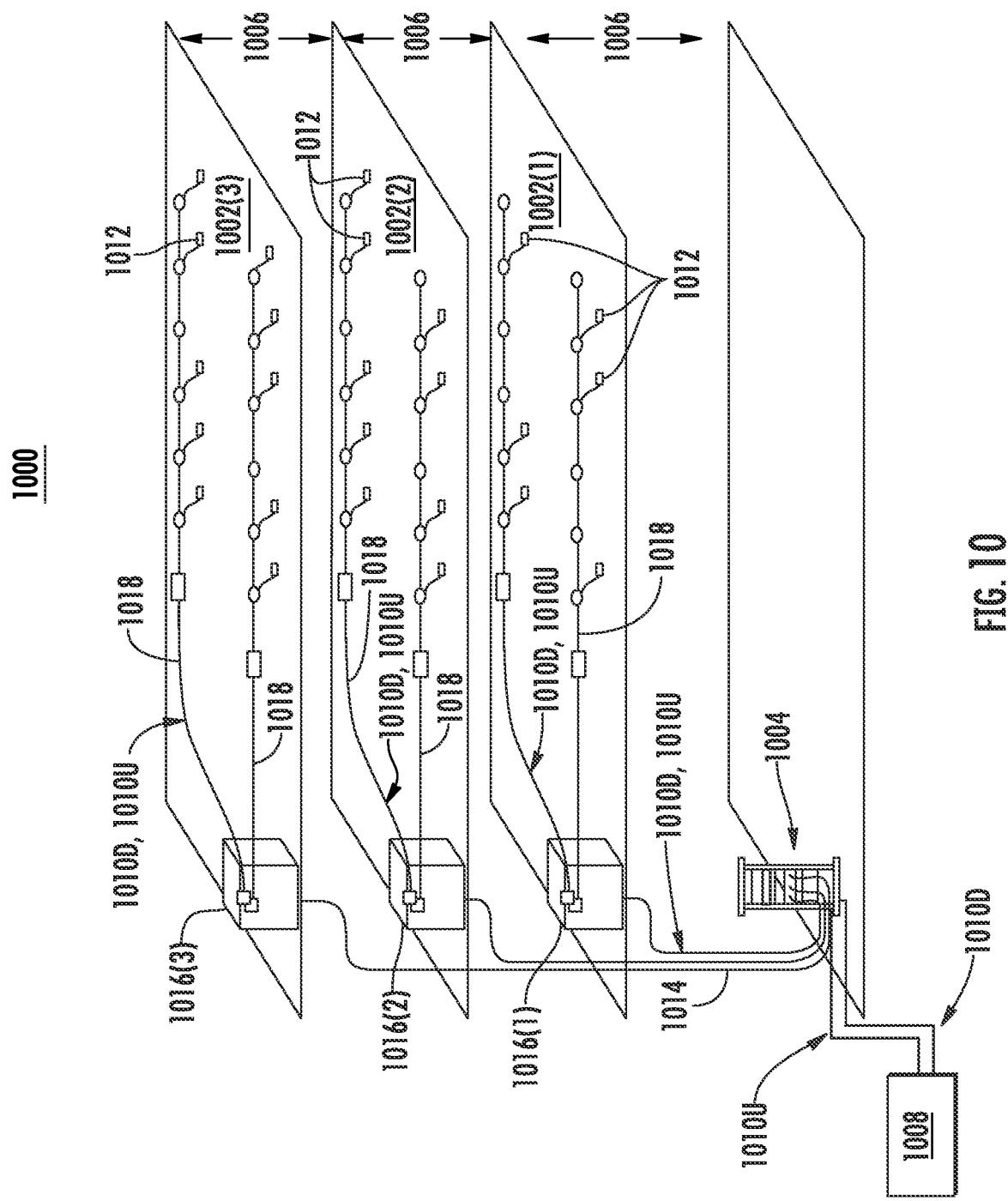
FIG. 10 is a partial schematic cut-away diagram of an exemplary building infrastructure in a WCS, such as the WCS of FIG. 1.

The WCS 100 of FIG. 1 having the dynamic control of the RUs can be provided in an indoor environment as illustrated in FIG. 10. FIG. 10 is a partial schematic cut-away diagram of an exemplary building infrastructure 1000 in a WCS, such as the WCS 100 of FIG. 1. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D from the base station 1008. The central unit 1004 is communicatively coupled to a plurality of RUs 1012 (e.g., RUs 206(1)-206(N)) to distribute the downlink communications signals 1010D to the RUs 1012 and to receive uplink communications signals 1010U from the RUs 1012, as previously discussed above. The downlink communications signals 1010D and the uplink communications signals 1010U communicated between the central unit 1004 and the RUs 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the RUs 1012 and also provide power to the RUs 1012 via array cables 1018.

Figure 11:
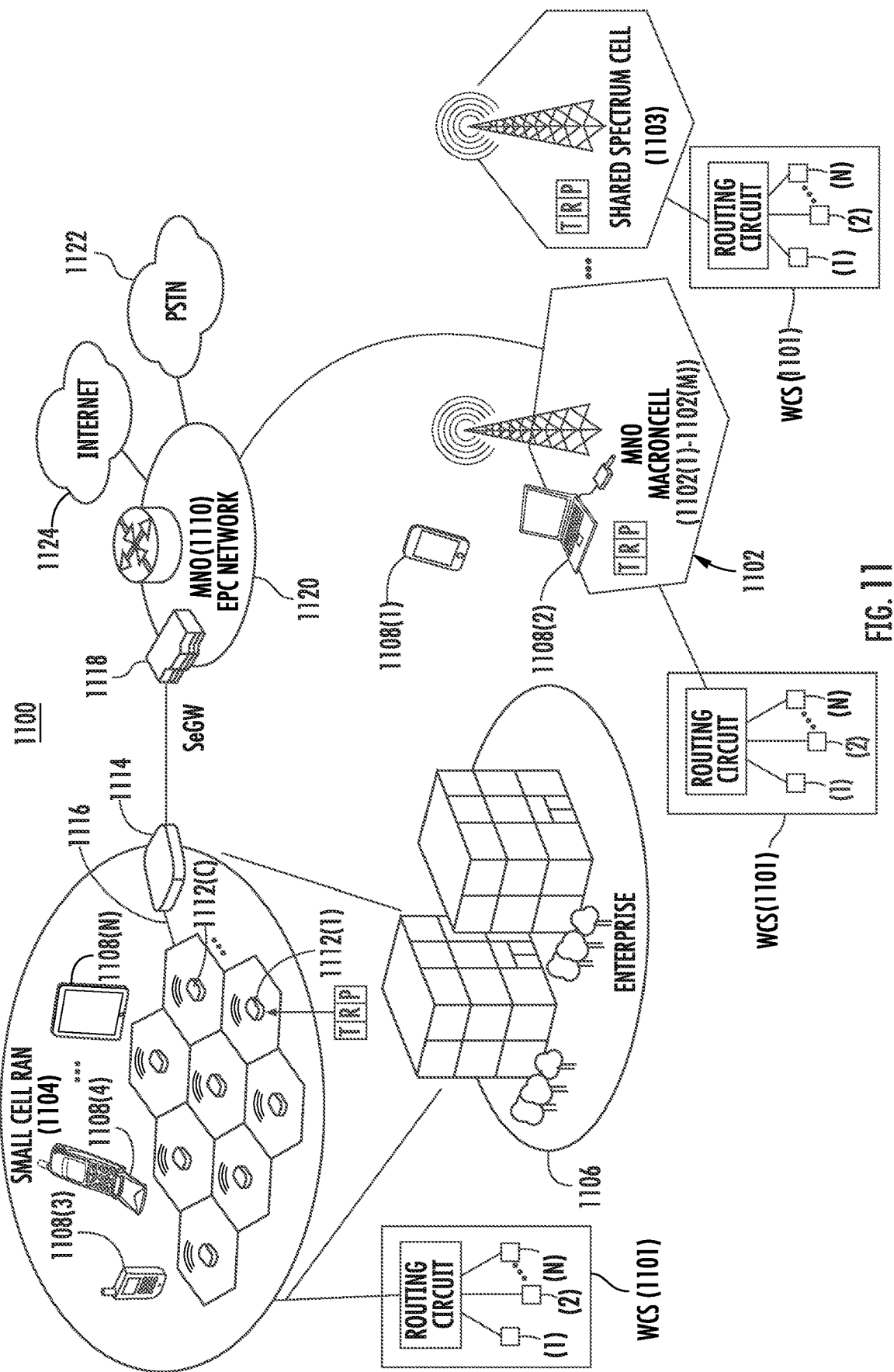
FIG. 11 is a schematic diagram of an exemplary mobile telecommunications environment that can includes the WCS of FIG. 1.

The WCS 100 of FIG. 1 can also be interfaced with different types of radio nodes of service providers and/or supporting service providers, including macrocell systems, small cell systems, and remote radio heads (RRH) systems, as examples. For example, FIG. 11 is a schematic diagram of an exemplary mobile telecommunications environment 1100 (also referred to as "environment 1100") that includes radio nodes and cells that may support shared spectrum, such as unlicensed spectrum, and can be interfaced to shared spectrum WCSs 1101 supporting coordination of distribution of shared spectrum from multiple service providers to remote units to be distributed to subscriber devices. The shared spectrum WCSs 1101 can include the WCS 100 of FIG. 1.

The environment 1100 includes exemplary macrocell RANs 1102(1)-1102(M) ("macrocells 1102(1)-1102(M)") and an exemplary small cell RAN 1104 located within an enterprise environment 1106 and configured to service mobile communications between a user mobile communications device 1108(1)-1108(N) to a mobile network operator (MNO) 1110. A serving RAN for the user mobile communications devices 1108(1)-1108(N) is a RAN or cell in the RAN in which the user mobile communications devices 1108(1)-1108(N) have an established communications session with the exchange of mobile communications signals for mobile communications. Thus, a serving RAN may also be referred to herein as a serving cell. For example, the user mobile communications devices 1108(3)-1108(N) in FIG. 11 are being serviced by the small cell RAN 1104, whereas the user mobile communications devices 1108(1) and 1108(2) are being serviced by the macrocell 1102. The macrocell 1102 is an MNO macrocell in this example. However, a shared spectrum RAN 1103 (also referred to as "shared spectrum cell 1103") includes a macrocell in this example and supports communications on frequencies that are not solely licensed to a particular MNO, such as CBRS for example, and thus may service user mobile communications devices 1108(1)-1108(N) independent of a particular MNO. For example, the shared spectrum cell 1103 may be operated by a third party that is not an MNO and wherein the shared spectrum cell 1103 supports CBRS. Also, as shown in FIG. 11, the MNO macrocell 1102, the shared spectrum cell 1103, and/or the small cell RAN 1104 can interface with a shared spectrum WCS 1101 supporting coordination of distribution of shared spectrum from multiple service providers to remote units to be distributed to subscriber devices. The MNO macrocell 1102, the shared spectrum cell 1103, and the small cell RAN 1104 may be neighboring radio access systems to each other, meaning that some or all can be in proximity to each other such that a user mobile communications device 1108(3)-1108(N) may be able to be in communications range of two or more of the MNO macrocell 1102, the shared spectrum cell 1103, and the small cell RAN 1104 depending on the location of the user mobile communications devices 1108(3)-1108(N).

In FIG. 11, the mobile telecommunications environment 1100 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1100 includes the enterprise environment 1106 in which the small cell RAN 1104 is implemented. The small cell RAN 1104 includes a plurality of small cell radio nodes 1112(1)-1112(C). Each small cell radio node 1112(1)-1112(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 11, the small cell RAN 1104 includes one or more services nodes (represented as a single services node 1114) that manage and control the small cell radio nodes 1112(1)-1112(C). In alternative implementations, the management and control functionality may be incorporated into a radio node, distributed among nodes, or implemented remotely (i.e., using infrastructure external to the small cell RAN 1104). The small cell radio nodes 1112(1)-1112(C) are coupled to the services node 1114 over a direct or local area network (LAN) connection 1116 as an example, typically using secure IPsec tunnels. The small cell radio nodes 1112(1)-1112(C) can include multi-operator radio nodes. The services node 1114 aggregates voice and data traffic from the small cell radio nodes 1112(1)-1112(C) and provides connectivity over an IPsec tunnel to a security gateway (SeGW) 1118 in a network 1120 (e.g., evolved packet core (EPC) network in a 4G network, or 5G Core in a 5G network) of the MNO 1110. The network 1120 is typically configured to communicate with a public switched telephone network (PSTN) 1122 to carry circuit-switched traffic, as well as for communicating with an external packet-switched network such as the Internet 1124.

The environment 1100 also generally includes a node (e.g., eNodeB or gNodeB) base station, or "macrocell" 1102. The radio coverage area of the macrocell 1102 is typically much larger than that of a small cell where the extent of coverage often depends on the base station configuration and surrounding geography. Thus, a given user mobile communications device 1108(3)-1108(N) may achieve connectivity to the network 1120 (e.g., EPC network in a 4G network, or 5G Core in a 5G network) through either a macrocell 1102 or small cell radio node 1112(1)-1112(C) in the small cell RAN 1104 in the environment 1100.

Figure 12:
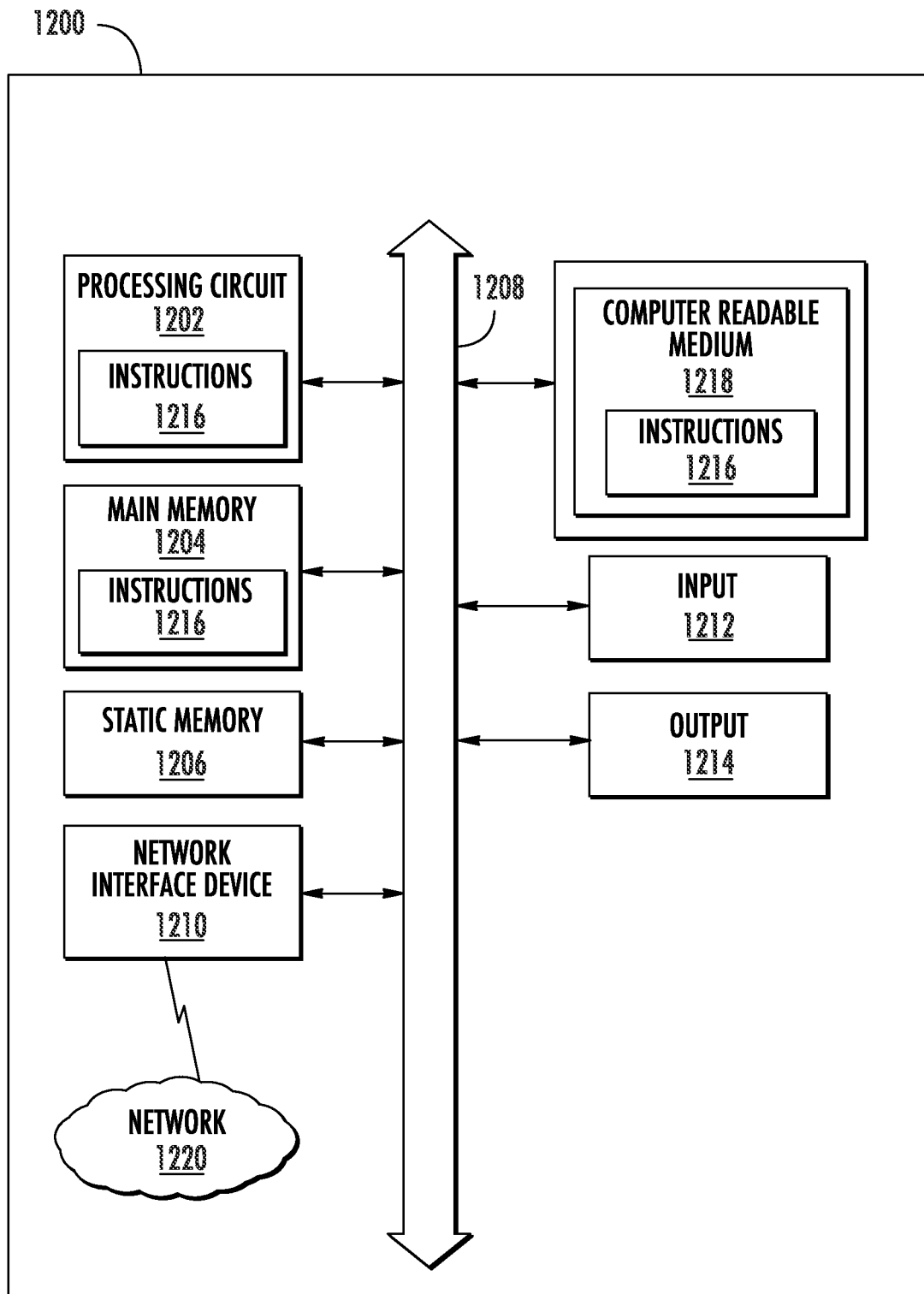
FIG. 12 is a schematic diagram of a representation of an exemplary computer system that can be included in or interfaced with any of the components in the WCS of FIG. 1, wherein the exemplary computer system is configured to execute instructions from an exemplary computer-readable medium.

Any of the circuits in the WCS 100 of FIG. 1 such as the DRU, BBU, RU, or the like, can include a computer system 1200, such as that shown in FIG. 12, to carry out their functions and operations. With reference to FIG. 12, the computer system 1200 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing circuit or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing circuit 1202 may be connected to the main memory 1204 and/or static memory 1206 directly or via some other connectivity means. The processing circuit 1202 may be a controller, and the main memory 1204 or static memory 1206 may be any type of memory.

The processing circuit 1202 represents one or more general-purpose processing circuits such as a microprocessor, central processing unit, or the like. More particularly, the processing circuit 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1202 is configured to execute processing logic in instructions 1216 for performing the operations and steps discussed herein.

The computer system 1200 may further include a network interface device 1210. The computer system 1200 also may or may not include an input 1212 to receive input and selections to be communicated to the computer system 1200 when executing instructions. The computer system 1200 also may or may not include an output 1214, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting the computer-readable medium 1218. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A digital routing unit (DRU) comprising:
   a summation circuit coupled to a plurality of remote units (RUs), wherein each remote unit comprises:
   an antenna configured to send to and receive signals from user equipment; and
   a first extractor circuit configured to detect information within the received signals, wherein the information indicates active user equipment.

2. The DRU of claim 1, wherein the first extractor circuit is configured to detect sounding reference signal (SRS) information, and the selection signal is based on the SRS information.

3. The DRU of claim 2, wherein the first extractor circuit is configured to provide the information to a remotely positioned decode circuit.

4. The DRU of claim 3, wherein the first extractor circuit is configured to provide the information to the remotely positioned decode circuit is configured to send the information to a digital unit or a baseband unit.

5. The DRU of claim 1, wherein the summation circuit is configured to:
   receive a selection signal, the selection signal comprising selection information indicating a second plurality of RUs that is a subset of the plurality of RUs, and wherein each of the second plurality of RUs is actively serving user equipment; and
   generate a summed data signal for transmission based on the selection signal.

6. The DRU of claim 1, further comprising a second extractor circuit configured to detect a request for service from user equipment.

7. The DRU of claim 6, wherein the second extractor circuit is configured to detect the request for service in a preamble channel (PRACH).

8. The DRU of claim 6, wherein the second extractor circuit is configured to provide the request for service to a second remotely positioned decode circuit.

9. The DRU of claim 8, wherein second extractor circuit configured to provide the request for service to the second remotely positioned decode circuit is configured to send the information to a digital unit or a baseband unit.

10. The DRU of claim 1, further comprising a splitter configured to receive a data signal and split the data signal for transmission to selected ones of the plurality of RUs based on a transmission selection signal.

* * * * *